United States Patent [19] [11] Patent Number: 4,792,874
MacDonald, II et al. [45] Date of Patent: Dec. 20, 1988

[54] STABILIZER DEVICE HAVING AN EDGE CONFIGURATION FOR STABILIZING THE INTERFACE BETWEEN A TRANSDUCER AND A MOVING MEDIUM

[75] Inventors: John C. MacDonald, II; Rodney D. Wagner, both of Rochester, N.Y.

[73] Assignee: Eastman Kodak Company, Rochester, N.Y.

[21] Appl. No.: 19,468

[22] Filed: Feb. 26, 1987

[51] Int. Cl.⁴ .............................................. G11B 5/60
[52] U.S. Cl. .................................................. 360/102
[58] Field of Search ............... 360/102, 103, 122, 129, 360/130.21

[56] References Cited

U.S. PATENT DOCUMENTS

| 3,821,813 | 6/1974 | Freeman | 360/103 |
| 4,003,091 | 1/1977 | Wright | 360/102 |
| 4,151,573 | 4/1979 | Tandon | 360/104 |
| 4,376,960 | 3/1983 | Karol | 360/99 |
| 4,379,315 | 4/1983 | Schuler | 360/105 |
| 4,396,965 | 8/1983 | DeMoss | 360/102 |
| 4,414,592 | 11/1983 | Losee | 360/102 |
| 4,578,727 | 3/1986 | Hills | 360/102 |
| 4,620,250 | 10/1986 | Hills | 360/102 |

FOREIGN PATENT DOCUMENTS 60-150264 8/1985 Japan .
61-9868 1/1986 Japan .

OTHER PUBLICATIONS

IBM T.D.B., vol. 27, No. 2, Jul. 1984; A. Cox; Head Assembly for Flexible Disk Applications, pp. 1294–1295.
IBM TDB, vol. 19, #5, Oct. 1976; p. 1885; 'Stabilized Wasp-Waist Head'; Nelson, Talke & Tseng.

*Primary Examiner*—A. J. Heinz
*Attorney, Agent, or Firm*—David M. Woods

[57] ABSTRACT

A stabilizer is shown with a special leading edge for enhancing the magnetic interface between a magnetic head and a rapidly moving pliable magnetic disk. The stabilizer includes a stabilizing block with an opening through which the head protrudes for engagement with the disk. A flat, circumferential air bearing surface surrounds the opening adjacent the disk for generating coupling forces that deform the disk out of its nominal plane and into intimate contact with a transducing gap on the head. The leading edge of the stabilizer has a generally arcuate surface that abruptly meets the air bearing surface at a non-tangential transition. The transition appears to the disk as a fulcrum, imparting a torque to the disk that contributes to the coupling forces and ensures "capture", that is, interface, even with disks having troublesome irregularities such as warps.

6 Claims, 6 Drawing Sheets

STABILIZER DEVICE HAVING AN EDGE CONFIGURATION FOR STABILIZING THE INTERFACE BETWEEN A TRANSDUCER AND A MOVING MEDIUM

BACKGROUND OF THE INVENTION

1. Field of the Invention

The invention generally relates to recording and/or reproducing apparatus for use with a flexible storage medium, such as a non-rigid disk. More particularly, the invention relates to a stabilizer device supported in relation to a magnetic head for maintaining an effective interface between the head and a magnetic storage medium.

2. Description Relative to the Prior Art

Magnetic recording and playback relative to a pliant, "floppy" magnetic disk requires that a constant interface be maintained between the moving disk and a magnetic record/playback head. The stability of the interface typically depends upon an air bearing effect. Further stability is obtained by interposing the magnetic disk between the head and a pressure-exerting backing member that forces the disk to conform to the head. For contact recording, the magnetic disk is brought into effective contact with the magnetic head. In practice, a small film of air, typically a few microinches, may actually be interposed between the head and the surface of the magnetic disk during contact operation. Many factors, such as fluttering at high speeds, may change the spacing and the stability of the interface between the disk surface and the magnetic head.

U.S. Pat. No. 4,578,727 discloses that the interface in a contact system may be stabilized by surrounding the transducing surface of the magnetic head with a small, flat air bearing surface. The head is supported in relation to an opening in the air bearing surface to a negative pressure cavity. When the disk is rotated at relatively high speeds, a negative pressure is formed in the cavity that pulls a nearby section of the rotated disk into contact with the transducing surface of the head thereby ensuring a constant interface for effective magnetic coupling. In companion U.S. Pat. No. 4,620,250, the air bearing surface is disposed at an angle with respect to the disk medium so that a leading edge of the air bearing surface penetrates slightly into the nominal plane of the rotating disk, thus "scraping" air away from the surface and "choking" off the flow of air over the air bearing surface. This is believed to assist in the formation of strong coupling forces along the air bearing surface. With both patents, magnetic coupling is effected without the necessity of opposing the air bearing surface with a backing member.

Nonetheless, it is difficult to continuously stabilize the magnetic interface if there is any irregularity inherent in the medium forming the disk, especially an irregularity due to a "warp" or like deformation in the medium. It has been found that virtually undetectable deformations are present in a wide variety of otherwise acceptable disks, particularly in a disk of the type having a central hub that is fastened to the disk. The presently known stabilizers are ineffective in consistently "capturing", that is, establishing an interface with, the surface of such irregular disks. Either the recovered signal drops off unacceptably, e.g., by more than 3db, or head/disk contact cannot be maintained for a full revolution of the disk, i.e., signal dropouts occur.

SUMMARY OF THE INVENTION

It stands to reason that the leading edge of the stabilizer in an un-backed contact system should blend gradually into the flat air bearing surface along which the medium rides. Otherwise the stabilizer itself might introduce unwanted perturbations into the rapidly moving magnetic surface. This approach is shown by the aforementioned U.S. Pat. No. 4,620,250, which shows a stabilizer with a constant radius edge that smoothly blends into the flat top surface. No matter how well the edge blends into the flat air bearing surface, however, the stabilizer is still unable to effectively "capture" certain media having, it is believed, a slight irregularity in the nature of a warp. "Capture" may be enhanced by having the stabilizer penetrate more forcefully into the disk surface, but this leads to shortened head life and increased disk wear.

The present invention run counter to such conventional wisdom by intentionally establishing an abrupt transition in the leading edge of the air bearing surface that penetrates the nominal plane of the moving disk. Rather than perturbing the disk, the transition, which is a lineal edge facing the oncoming medium, appears to act as a fulcrum. A torque is apparently generated that turns a section of the moving disk about the lineal transition and flattens the disk down upon the head. This force would appear to contribute to the coupling forces seen in prior art devices. Whatever the exact mechanism, a stabilizer having this type of leading edge, establishes and stabilizes an effective magnetic interface for all but the most significantly warped disks.

A stabilizer according to the invention comprises a stabilizing block having a cavity in which a transducer is supported. A circumferential flat air bearing surface is formed around the cavity on the side of the stabilizing block that faces a moving storage medium. The circumferential surface has a curved edge on at least the side facing the advancing storage medium. According to the invention, the curved edge comprises a generally arcuate surface that meets the flat air bearing surface in non-tangential relation at a relatively abrupt transition. The stabilizing block is disposed at an angle with respect to the nominal plane of the recording medium so that the curved edge including the abrupt transition contacts the medium. This causes the medium to be deflected upon the transducer and an effective magnetic interface is thereby obtained.

BRIEF DESCRIPTION OF THE DRAWINGS

The invention will be described in relation to the drawings in which.

DETAILED DESCRIPTION OF THE PREFERRED EMBODIMENT

The invention will be described in relation to a transducer and the cooperation of such a transducer with a moving storage medium in order to establish an effective interface for mutual coupling of a signal. A drive unit for moving the medium is conventional and will not be specifically described. The preferred embodiment will be described in relation to a magnetic transducer and a magnetic storage medium such as a magnetic disk. While the description is directed generally to a magnetic disk, it should be understood that the disk can be one that is permanently emplaced in the drive unit, or one that is removable from the drive unit, and furthermore that a removable disk can be a self contained unit or contained within a conventional cartridge having openings for access to the disk.

Figure 1:
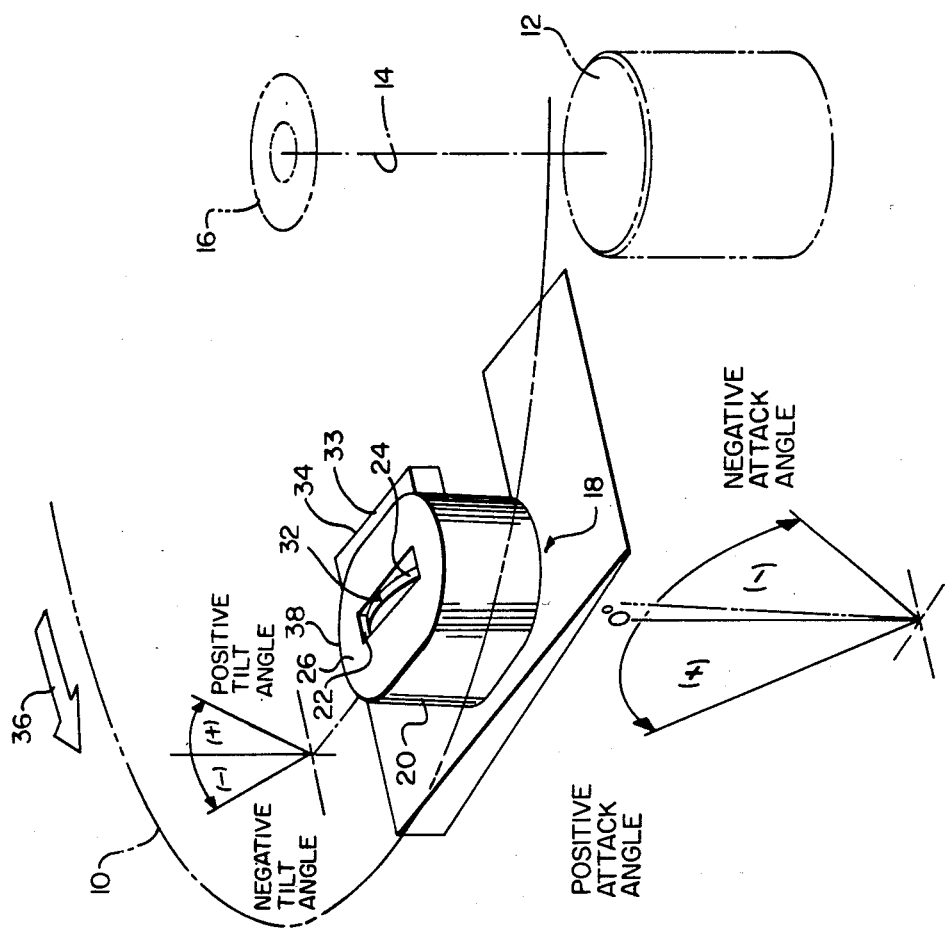
FIG. 1 is a perspective view of a stabilizer arranged according to the invention at a negative attack angle in relation to a moving medium.
Figure 2:
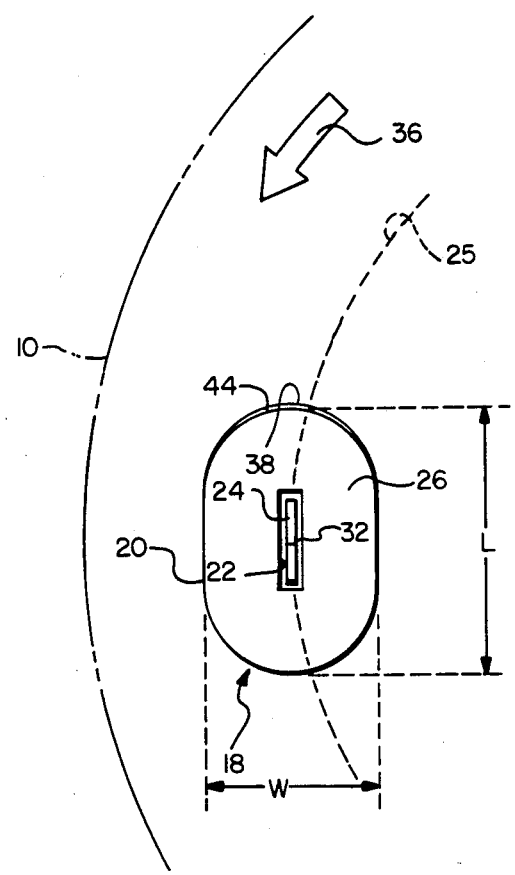
FIG. 2 is a plan view of the stabilizer of FIG. 1, as seen through the medium.
Figure 3:
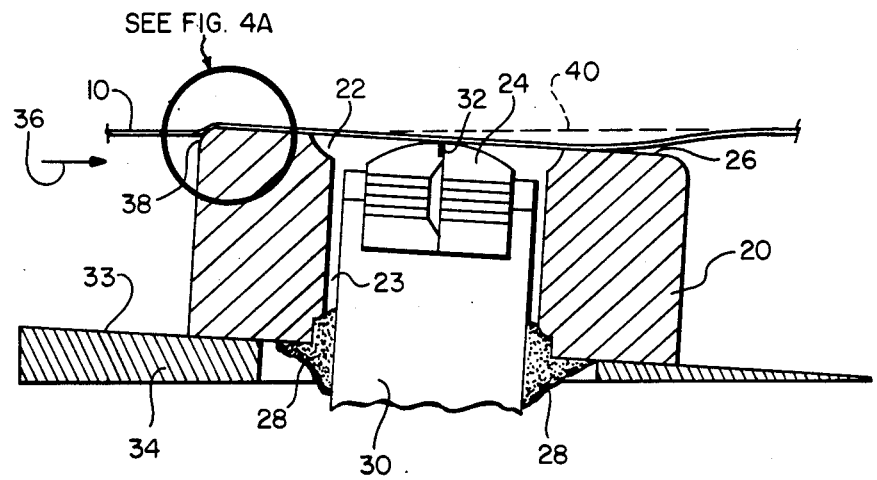
FIG. 3 is a cross-sectional view of the stabilizer of FIG. 1, showing in particular its penetration into the nominal plane of the moving medium.

Details of the stabilizer device are shown by FIGS. 1, 2 and 3. A magnetic disk 10 (shown in broken line in FIGS. 1 and 2 so as to reveal underlying structure) is mounted for rotation by a drive motor 12. The motor 12 has a spindle 14 connecting to a hub 16 that is securely attached to an inside periphery of the disk 10. A stabilizer device 18 includes a stabilizing block 20 having an opening 22 of the disk 10. A circumferential, flat air bearing surface 26 surrounds the opening 22 on the side of the block 20 that faces the disk 10. Though the circumferential surface 26 is shown to be oval in shape, no particular shape is required for practice of the invention. As best shown by FIG. 2, the preferred embodiment is used in a system in which the head 24 traces a circular track 25 during recording and repeatedly traces the same track 25 during reproduction. Each track can correspond, for example, to a single video picture in a still video recording/reproduction system.

As best shown by FIG. 3, the opening 22 leads to a cavity 23 in the block 20. A non-magnetic potting compound 28, such as epoxy, supports a shoe 30 within the cavity 23 in relation to the stabilizing block 20. The head 24 is mounted on the shoe 30 to locate a magnetic gap 32 in relation to the opening 22 so that the gap 32 slightly protrudes above the plane of the air bearing surface 26. The stabilizing block 20 is supported with respect to the disk 10 along a flat inclined surface 33 of a wedge-shaped support 34 mounted upon a conventional head positioning carriage (not shown). As shown by FIG. 1, the support 34 and the head 24 therewith are disposed at a particular angle (the attack angle) with respect to magnetic track movement and at a further particular angle (the tilt angle) with respect to a radial of the disk 10. While the precise dimensions of the stabilizer are not critical and may vary depending upon the size of the disk, head structure, etc., it may be helpful to disclose the particular dimensions used in connection with a single track head for recording fifty circular tracks on a disk 47 mm in diameter. Referring to FIG. 2, the length L of a suitable stabilizing block 20 in this environment is 0.350 inches and the width W is 0.250 inches. Even for these disks and track dimensions, other stabilizer dimensions are likely to be suitable. Likewise, this invention applies to any size disk with attendant changes, if necessary, in the stabilizer dimensions.

When the magnetic disk 10 is rapidly rotated by the drive motor 12 in a direction shown by an arrow 36, successive portions of the disk 10 encounter a leading curved edge 38 of the flat air bearing surface 26. The angle of the wedge-shaped support 34, which defines the attack angle, limits penetration of the leading curved edge 38 into a nominal plane 40 of the disk 10. (The nominal plane is the plane established by the rotating disk absent any interference.) The extent of penetration is generally quite small, e.g., 0.006 in. Preferably the attack angle should be as small as possible to prevent wear of the transducer and/or media surfaces. In the preferred embodiment, the air bearing surface 26 is disposed at a negative angle of attack of 2.3° and at a tilt angle of 0°. Nonetheless, the magnetic interface should be maintainable at a variety of attack angles, tilt angles, and penetration distances because assembly of the head, stabilizer and wedge requires tolerance of some assembly variation. Furthermore, since the attack angle and the tilt angle are measured with respect to the nominal plane 40 of the disk 10, any perturbation of a local area of the disk 10 such as caused by a warp has the effect of varying the attack and tilt angles and of thus compounding the tolerance required for assembly.

Figure 4A:
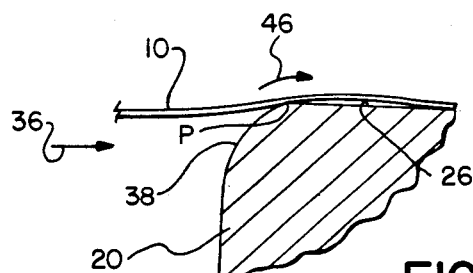
FIGS. 4A and 4B are detailed views of a leading edge portion of the stabilizer of FIG. 3, one showing the interface between the medium and the stabilizer and the other showing the angular configuration of the leading edge.
Figure 4B:
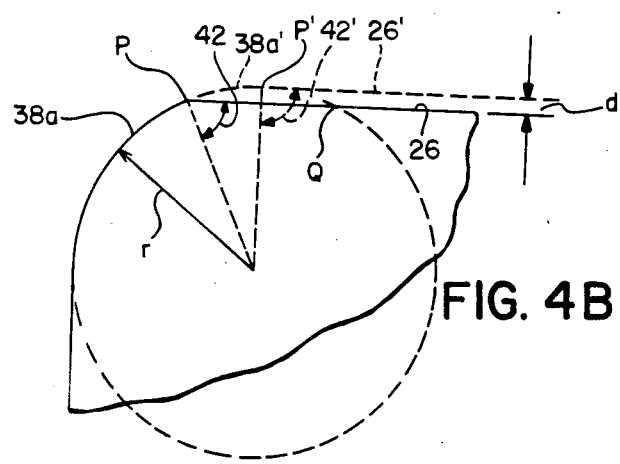

The invention is concerned with the shape of the leading edge 38. As shown by FIG. 4B, a portion 38a of the leading edge 38 is defined by a radius r (r=0.012 in. according to the preferred embodiment) up to a certain point P, where the smoothly varying surface 38a abruptly meets the flat air bearing surface 26 in a non-tangential transition. As further shown by broken line in FIG. 4B, if the radius r is allowed to further trace a surface to point P', the joinder with the flat surface 26' (parallel to surface 26) would be in tangential relation, that is, the line defined by the surface 26' would be tangent to the circle described by radius r. This broken line surface 26', and the broken line portion 38a', in fact describe the blended type of leading edge found in the prior art (typified by the aforementioned U.S. Pat. Nos. 4,620,250 and 4,578,727). As distinct from the prior art, the edge-tracing radius r meets the air bearing surface 26 at an included angle 42 that is acute, rather than at a right angle 42', as in the prior art. When the leading edge 38 is subjected to an abrupt transaction at the point P in accordance with the invention, it can be seen that the air bearing surface 26 conincides with a chord PQ of the circle defined by the radius r. In the preferred embodiment, the perpendicular distance d of this chord PQ from the broken line surface 26' is between 0.0005 and 0.0015 inches.

As better shown by FIG. 2, the transition point P is one of many points defining a curved line 44 that first meets the surface of the disk 10 as it is rotated over the penetrating leading edge 38 of the stabilizer 18. This curved line 44, again shown as a point P in FIG. 4A, serves as a fulcrum about which the contacting section of the disk 10 attempts to rotate. Though the precise mechanism is not well established, it is believed that a torque force is generated according to an arrow 46 (FIG. 4A) that attempts to twist the disk 10 clockwise. This force serves to deflect the disk 10 from its nominal plane 40 firmly upon the air bearing surface 26 despite any irregularities such as warps. In addition, it is believed that the leading edge 38 operates as an "air scraper" to choke off the flow of moving air over the air bearing surface 26, thereby forming a Bernoulli pull down force across the surface, which also helps to deflect the disk 10 from its nominal plane 40. Furthermore, as successive portions of the disk 10 move over the opening 22 and its underlying cavity 23, air will be removed from the cavity, causing the formation of a negative low pressure in the cavity. This negative pressure generates a pull down force on successive portions of the rotated disk 10 as each portion is moved across the opening, which further deflects the disk 10 into contact with the transducer gap 32 of the head 24.

Figure 5:
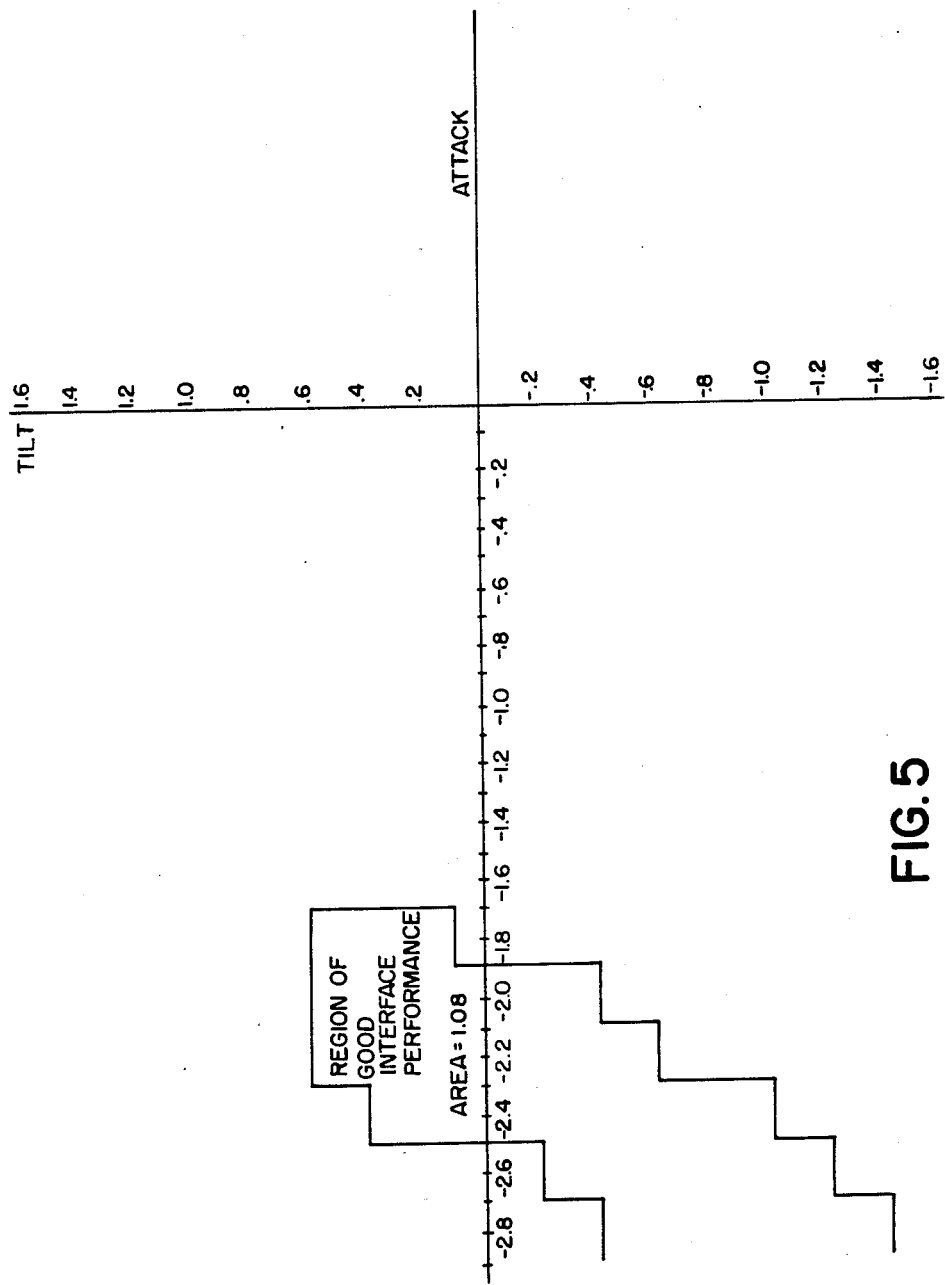
FIG. 5 is a graph showing the region of good interface performance for a stabilizer of the type disclosed by the prior art.
Figure 6:
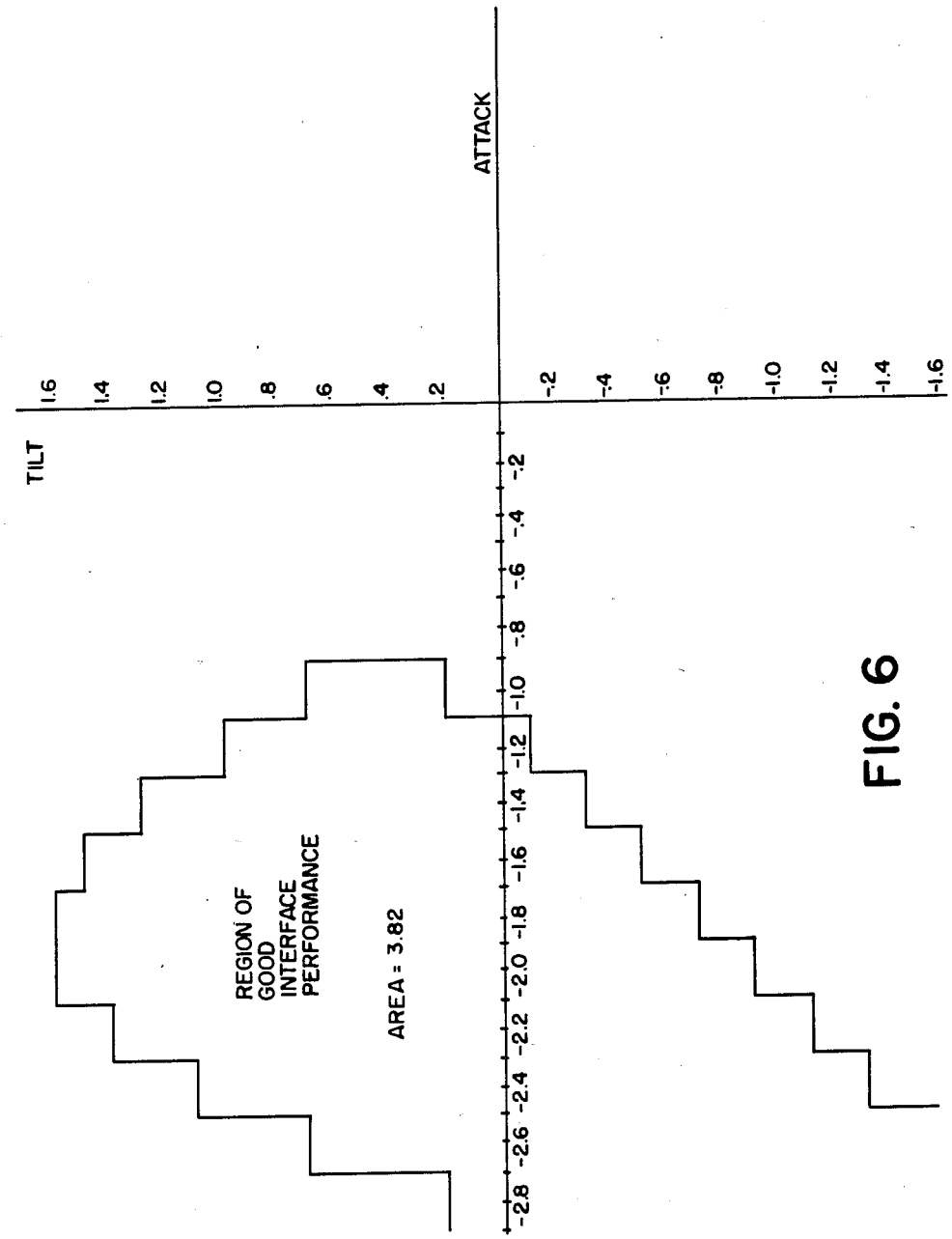
FIG. 6, which is to be compared with FIG. 5, is a graph showing the region of good interface performance for a stabilizer having an edge configured according to the invention.

The net interaction of all of these forces generates a sufficient coupling force for the stabilization of the magnetic interface even for media possessing significant warps or other deformations. This can be shown by reference to FIGS. 5 and 6. In both Figures, the region of good interface performance for a given head penetration is determined, for different attack and tilt angles, by two conditions, as follows. To be in the good region, a reproduced signal must not be attenuated by more than 3db compared to the best possible reproduced signal and a full signal envelope must be obtained over the entire track. The latter condition implies that, regardless of warps or other disk problems, the reproduced signal has no dropouts as a result of lost head and disk contact. FIG. 5 describes the region of good interface performance for a system using a stabilizer of the prior art, that is, a stabilizer having the configuration including the broken line portions 38a' and 26' shown by FIG. 4B. FIG. 6 shows the region of good interface performance for a stabilizer having an air bearing surface 26 that meets the leading edge 38 in a non-tangential relation at a point P as shown by FIG. 4B, that is, in accordance with the invention. The areas of each region are multiples of tilt degrees by attack degrees, that is, (degrees)$^2$.

It can be seen from FIG. 6 that the invention provides a significant improvement by giving good performance over a much broader range of angles for a given head penetration. This makes assembly less critical, and importantly, permits greater confidence in lessened attack angle with attendant benefits of lesser head and media wear. But most significantly in terms of this invention, the effective variation in attack and tilt angles caused by warps or other local deformations of the medium can be accommodated within the large region of good interface performance (assuming the same head penetration is maintained).

Figure 7:
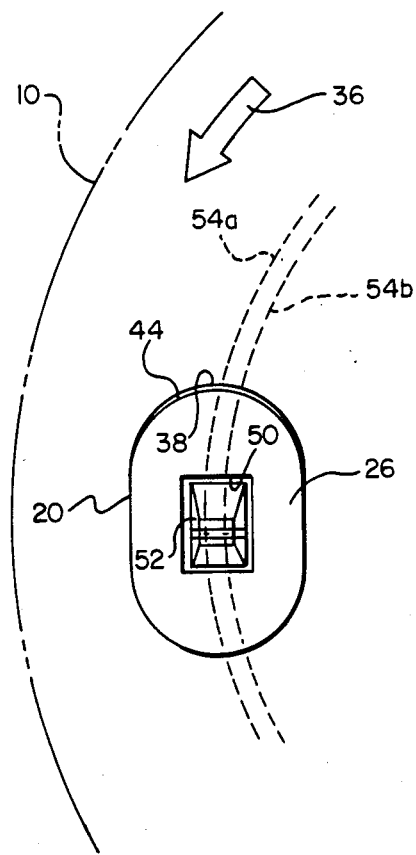
FIG. 7 is a plan view similar to FIG. 2 but of a stabilizer that supports a dual-track thin film head.

The invention has been described in detail with particular reference to a preferred embodiment thereof, but it will be understood that further variations and modifications can be effected within the spirit and scope of the invention. For example, as shown by FIG. 7, the stabilizer may have an opening 50 large enough to accommodate a dual gap head 52 for tracing two tracks 54a and 54b. Furthermore different types of head structure may be accommodated. For example, FIG. 7 shows an opening to a negative pressure cavity sufficient to contain the dual transducing gaps of a thin-film head 52 rather than a wound ferrite head. (In the case of a dual-gap stabilizer, it has been found that somewhat better pull-down performance is obtained by having the epoxy 28 completely seal one end of the cavity 23 (see FIG. 3). Conversely, such a complete seal is unnecessary for a single-gap stabilizer; indeed, vents are provided through the epoxy 28 if it should happen to seal the cavity 23.)

A stabilizer with a non-tangential transition edge 44 may be manufactured in any number of conventional ways. One way that works especially well is to manufacture a stabilizer of the type disclosed by the prior art, that is, a stabilizer with a continuation of the blended radius leading edge 38a', as shown in FIG. 4B, leading into the surface 26'. Then the surface 26' is lapped by conventional techniques until the lapped surface coincides with the air bearing surface 26 shown in FIG. 4B. This requires removal of a thickness corresponding to the distance d, that is, between 0.0005 and 0.0015 inch.

What is claimed is:

1. A stabilizer device for stabilizing the movement of a storage medium supported in a nominal plane and advanced in a predetermined direction in relation to a transducer, said device comprising:
    a stabilizing block having a cavity in which the transducer is supported on a side of said block facing the advancing storage medium;
    a smoothly rounded leading edge on said side of the block facing the advancing storage medium;
    a circumferential flat air bearing surface around said cavity on said side of the stabilizing block facing said medium, said flat air bearing surface intersecting said rounded leading edge and generating a sharp transition at the intersection therewith that forms an abrupt angular termination of the rounded leading edge at its junction with the flat air bearing surface; and
    means for disposing said stabilizing block at an angle with respect to the nominal plane of the storage medium so that said rounded edge contacts the medium and deflects the medium from the nominal plane over said sharp transition and upon the transducer.

2. A stabilizer device as claimed in claim 1 in which said rounded edge including said transition is so disposed as to penetrate slightly into said nominal plane.

3. A stabilizer device for stabilizing the magnetic interface between a magnetic storage medium and a magnetic head, said medium supported for movement in a nominal plane and advanced in a predetermined direction in relation to the magnetic head, said stabilizer comprising:
    a stabilizing block having a cavity in which the magnetic head is supported;
    a circumferential flat air bearing surface around said cavity on the side of said stabilizing block facing said medium;
    a curved edge on at least the side of said circumferential surface that faces the advancing storage medium, said edge comprising in cross section an arcuate segment defined by a radius that intersects a cross section of said air bearing surface at an included angle of less than 90°, thereby forming an abrupt transition between said curved edge and said air bearing surface over which said medium is deflected out of the nominal plane and thrust upon said magnetic head.

4. A stabilizer device as claimed in claim 3 further including means for disposing said stabilizing block at an angle with respect to the nominal plane of the storage medium so that said curved edge including said transition penetrates slightly into said nominal plane.

5. A magnetic head stabilizer for stabilizing the movement of a magnetic record advanced in a predetermined direction in relation to a magnetic head mounted in the stabilizer, said stabilizer comprising:
    a leading curved surface disposed so that it contacts the advancing record medium before the medium reaches the magnetic head, said curved surface having a cross-section that generally corresponds to the circumference of part of a circle; and a flat air bearing surface having a cross section that aligns with a chord of said circle and consequently meets said leading curved surface at an abrupt transition that facilitates contact between the magnetic head and the record.

6. Recording and/or reproducing apparatus of the type provided with (a) means for supporting a flexible magnetic disk for rotation in a nominal plane and (b) a record and/or playback head for contacting the disk and recording and/or reproducing a signal on the disk, said apparatus comprising:

a substantially flat air bearing surface for stabilizing the flexible disk as it is rotated over said surface;

means, integral with said air bearing surface, defining a cavity having an opening to said surface for exerting a stabilizing force on successive portions of the rotated disk as each portion is moved over said opening;

means for supporting said head in said cavity to contact successive portions of the rotated disk;

means, integral with said air bearing surface, defining a leading curved surface located upstream with respect to the direction of rotation of the disk, said curved surface having an arcuate cross section defined by a radius that meets a cross section of said air bearing surface at an included angle of less than 90° to form a relatively sharp transition with said surface; and means for disposing said air bearing surface at a negative attack angle with respect to the rotated disk so that said leading surface including said transition slightly penetrates into the nominal plane of the rotated disk.

* * * * *